United States Patent
Stauffer

(10) Patent No.: US 10,493,397 B2
(45) Date of Patent: Dec. 3, 2019

(54) CARBON DIOXIDE RECOVERY

(71) Applicant: John E. Stauffer, Greenwich, CT (US)

(72) Inventor: John E. Stauffer, Greenwich, CT (US)

( * ) Notice: Subject to any disclaimer, the term of this patent is extended or adjusted under 35 U.S.C. 154(b) by 0 days.

(21) Appl. No.: 15/966,459

(22) Filed: Apr. 30, 2018

(65) Prior Publication Data

US 2018/0243681 A1   Aug. 30, 2018

Related U.S. Application Data

(63) Continuation-in-part of application No. 15/600,043, filed on May 19, 2017, now abandoned, which is a continuation-in-part of application No. 14/798,827, filed on Jul. 14, 2015, now abandoned.

(51) Int. Cl.

| | | |
|---|---|---|
| *B01D 53/62* | (2006.01) | |
| *B01D 53/14* | (2006.01) | |
| *B01D 53/78* | (2006.01) | |
| *B01D 53/96* | (2006.01) | |

(52) U.S. Cl.
CPC ..... *B01D 53/1475* (2013.01); *B01D 53/1425* (2013.01); *B01D 53/1493* (2013.01); *B01D 53/62* (2013.01); *B01D 53/78* (2013.01); *B01D 2251/304* (2013.01); *B01D 2251/60* (2013.01); *B01D 2252/102* (2013.01); *B01D 2252/20405* (2013.01); *B01D 2257/504* (2013.01); *B01D 2258/0283* (2013.01)

(58) Field of Classification Search
None
See application file for complete search history.

(56) References Cited

U.S. PATENT DOCUMENTS

| | | |
|---|---|---|
| 1,849,844 A | 3/1932 | Joseph et al. |
| 2,276,192 A | 3/1942 | Hanford et al. |
| 3,887,689 A | 6/1975 | Carding et al. |
| 4,364,915 A | 12/1982 | Proctor |
| 4,562,174 A | 12/1985 | Stiles |
| 4,825,004 A | 4/1989 | Rutzen et al. |
| 4,913,842 A | 4/1990 | Yoneoka et al. |
| 5,070,016 A | 12/1991 | Hallberg |
| 5,395,991 A | 3/1995 | Scarlett et al. |
| 5,449,696 A | 9/1995 | Dandekar et al. |
| 5,453,412 A | 9/1995 | Deckers et al. |
| 5,663,429 A | 9/1997 | Yamaseki et al. |

(Continued)

FOREIGN PATENT DOCUMENTS

| | | |
|---|---|---|
| BE | 354228 A | 11/1928 |
| DE | 362746 C | 10/1922 |

(Continued)

OTHER PUBLICATIONS

V.N. Ipatieff, G. S. Monroe: "Synthesis of Methanol from Carbon Dioxide and Hydrogen over Copper-Alumina Catalysts. Mechanism of Reaction" J. Am. Chem. Soc., vol. 67, No. 12, Dec. 1945 (Dec. 1945), pp. 2168-2171, SP002543626.

(Continued)

*Primary Examiner* — Daniel Berns
(74) *Attorney, Agent, or Firm* — Young Basile Hanlon & MacFarlane, P.C.

(57) ABSTRACT

Carbon dioxide is separated from flue gas by scrubbing the gas with an aqueous solution of ammonia and salt, and the $CO_2$ is therefore released from the solution by heating. The scrubbing step is performed with a co-current stream of an aqueous solution of ammonia and a salt.

1 Claim, 1 Drawing Sheet

(56) References Cited

U.S. PATENT DOCUMENTS

| | | |
|---|---|---|
| 6,114,279 A | 9/2000 | Fukui et al. |
| 6,140,545 A | 10/2000 | Merger et al. |
| 6,274,108 B1 | 8/2001 | Fujii et al. |
| 6,452,058 B1 | 9/2002 | Schweizer et al. |
| 6,486,368 B1 | 11/2002 | Zhou et al. |
| 6,632,330 B1 | 10/2003 | Colley et al. |
| 7,199,276 B2 | 4/2007 | Sher et al. |
| 7,214,721 B2 | 5/2007 | Eastland |
| 7,288,689 B2 | 10/2007 | Janssen et al. |
| 7,696,390 B2 | 4/2010 | Stauffer |
| 7,977,272 B2 | 7/2011 | Miller et al. |
| 8,323,602 B2 | 12/2012 | Wright et al. |
| 8,440,868 B2 | 5/2013 | Stauffer |
| 8,512,460 B2 | 8/2013 | Moniwa et al. |
| 8,545,701 B2 | 10/2013 | Kelada |
| 8,581,010 B2 | 11/2013 | Stauffer |
| 8,728,423 B2 | 5/2014 | Iijima et al. |
| 8,795,415 B2 | 8/2014 | Katz et al. |
| 8,961,664 B2 | 2/2015 | Nakayama et al. |
| 9,155,991 B2 | 10/2015 | Ogawa et al. |
| 2007/0282018 A1 | 12/2007 | Jenkins et al. |
| 2008/0269519 A1 | 10/2008 | Miller et al. |
| 2010/0086983 A1 | 4/2010 | Gellett et al. |
| 2010/0196244 A1 | 8/2010 | Grauer et al. |
| 2011/0293968 A1 | 12/2011 | Leung et al. |
| 2012/0259145 A1 | 10/2012 | Stauffer |
| 2014/0199228 A1 | 7/2014 | Kniesburges |
| 2017/0080389 A1 | 3/2017 | Kelada |
| 2017/0206992 A1 | 7/2017 | Hong et al. |

FOREIGN PATENT DOCUMENTS

| | | |
|---|---|---|
| WO | 2008080767 A1 | 7/2008 |
| WO | 2009068594 A1 | 6/2009 |
| WO | 2015097674 A1 | 7/2015 |

OTHER PUBLICATIONS

European Search Report from co-pending EP Application No. 16 16 6532.8 (dated Dec. 7, 2016).

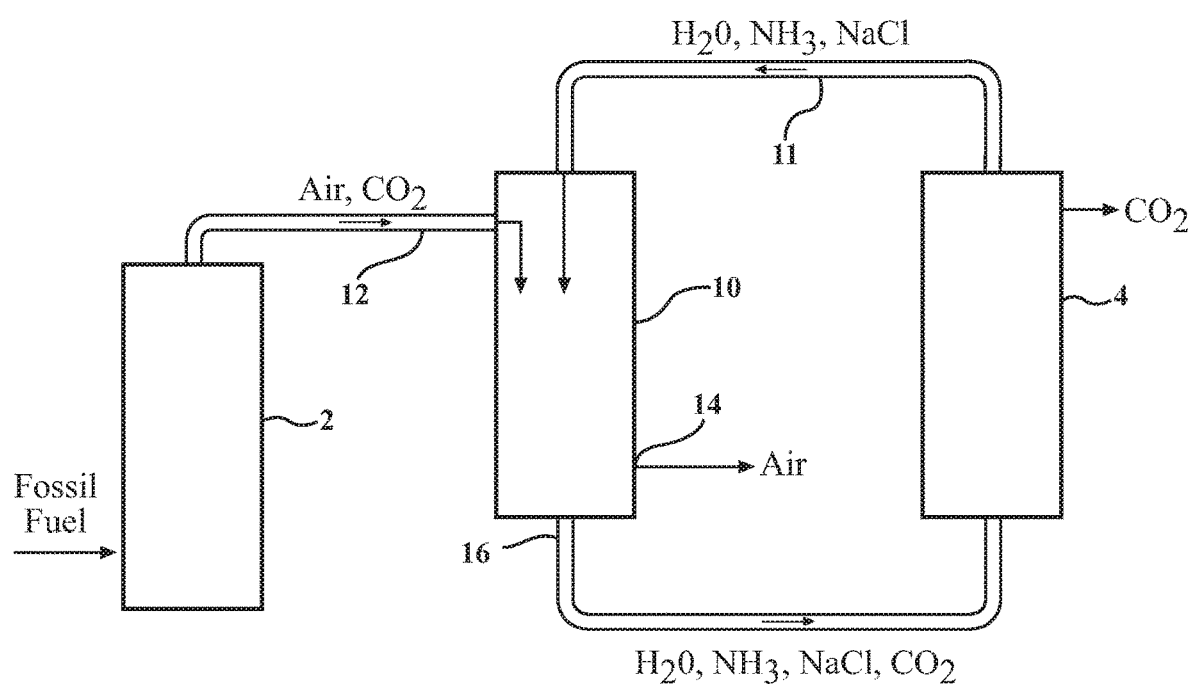

CARBON DIOXIDE RECOVERY

CROSS-REFERENCE TO RELATED APPLICATION(S)

This application is a continuation-in-part of U.S. patent application Ser. No. 15/600,043 filed May 19, 2017, which is a continuation-in part of U.S. patent application Ser. No. 14/798,827 filed Jul. 14, 2015, and hereby incorporates by reference the priority dates and contents of said applications in their entirety.

FIELD OF THE INVENTION

The present invention relates to a process for the recovery of carbon dioxde from flue gases. The process uses an aqueous solution of salt and an amine to scrub the flue gas and absorb carbon dioxide. The resulting solution is regenerated by heating it in order to strip out pure carbon dioxide gas.

BACKGROUND

There is a widespread concern for climate change characterized by environmental warming. Although the trend has been attributed to a number of causes, the greatest attention has been directed to the release of greenhouse gases. Chief among these gases is carbon dioxide because of its ability to trap heat.

With the growing concern about an increased concentration of carbon dioxide in the atmosphere, there is a movement to reduce the emissions of this greenhouse gas. The effort is being waged under the banner of "Carbon Capture and Storage," or "Carbon Capture and Sequester," also known as "CCS" for short. Success in this endeavor requires either the avoidance of carbon dioxide generation in the first place or the recovery of this gas from industrial processes. The most notable example is electric power generation.

Technology presently exists for the recovery of carbon dioxide from exhaust gas, but to date the application of this know-how has been limited. The primary target for this technology is the combustion of fossil fuels including coal, oil and natural gas. All three fuels are of concern, but coal has received the brunt of criticism because it is one hundred percent carbon and also because it poses other environmental risks due to such impurities as sulfur and mercury.

Focusing on the recovery of carbon dioxide while ignoring questions of storage and disposal, two approaches for carbon capture have been proposed. Carbon dioxide can either be recovered by adsorption on a solid sorbent or dissolved in an aqueous solution. In the first instance, such solid materials as activated carbon, Small zeolites, and metal organic frameworks are used to bind the carbon dioxide. Adsorption, however presents certain challenges. Care must be taken to avoid attrition of the solid sorbent. Additionally, significant energy is required to regenerate the sorbent. Either pressure swings or the heating of the sorbent to release the adsorbed gas is required.

A second method of carbon capture depends on the absorption of carbon dioxide in a solvent. In this application, an aqueous solution of an amine is most commonly used. The amine of choice is monoethanolamine. While the solvent is efficient in scrubbing flue gases, its regeneration presents a problem. Relatively high temperatures are required to strip carbon dioxide from pregnant solutions.

The conventional or "prior art" process is disclosed in WO 2015/053619 A1. Flue gas containing carbon dioxide is introduced to the bottom of a counter current scrubbing column while vent gas, mostly nitrogen, is removed overhead. Solvent with dissolved ammonia and salt is circulated between the scrubber and stripper. Inevitably, some ammonia escapes into the vent, thus rendering the process less efficient.

In summary, the available technology for carbon capture has a number of drawbacks. These handicaps are most serious in large scale facilities. The result is poor economics, which has held back the exploitation of current methodology.

The future prospect for carbon capture is very much dependent on the introduction of process improvements. The need for such advancements is all too apparent. Therefore, it is an object of the present invention to fulfill such aspirations. These and other objects and goals will become apparent from the following description and the drawing included therewith.

BRIEF DESCRIPTION OF THE DRAWINGS

The single FIGURE is a schematic drawing of a system for carrying out the present invention.

DETAILED DESCRIPTION

The present invention can best be appreciated by reviewing the relevant chemistry. Chemical reactions that occur are unique to the process. They indicate the principal advantages, namely, the efficiency in removing carbon dioxide from a gas stream and the ease with which the solvent can be regenerated.

In the first step of the process when the gas stream is contacted with the aqueous solution. The solution becomes saturated with $CO_2$ and the following chemical reactions take place.

$$NH3 + CO_2 + H_2O \rightarrow NH4HCO3 \qquad 1.$$

$$NH4HCO3 + NaCl \rightarrow NaHCO3 + NH4Cl \qquad 2.$$

In the first equation, ammonia reacts rapidly with carbon dioxide and water to provide ammonium bicarbonate. The second equation shows the rearrangement of ammonium bicarbonate with salt to give sodium bicarbonate and ammonium chloride. By combining these two reactions, the following expression is obtained for the overall reaction in the absorption step.

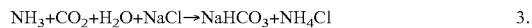

$$NH_3 + CO_2 + H_2O + NaCl \rightarrow NaHCO_3 + NH_4Cl \qquad 3.$$

The regeneration of the aqueous solution is shown by the following two equations.

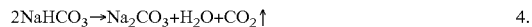

$$2NaHCO_3 \rightarrow Na_2CO_3 + H_2O + CO_2\uparrow \qquad 4.$$

$$Na2CO3 + NH_4Cl \rightarrow NaHCO3 + NaCl + NH3 \qquad 5.$$

The decomposition of sodium bicarbonate to give sodium carbonate and release carbon dioxide is indicated by equation 4. This reaction occurs under the application of heat. Finally, sodium carbonate, strongly alkaline in solution, reacts with ammonium chloride to form sodium bicarbonate, salt, and ammonia. When equations 4 and 5 are combined, the following equation is obtained showing the regeneration process.

$$NaHCO_3 + NH_4Cl \rightarrow NH_3 + NaCl + H2O + CO2\uparrow \qquad 6.$$

As one can see from this expression, the resulting solution containing ammonia and salt is identical to the solution used in scrubbing carbon dioxide shown in equation 3. Thus, the regenerated solution can be recycled to the absorption step.

The conditions of the process are important. The absorption step is conducted at atmospheric pressure or close to this level. The temperature for absorption is in the range of about 15° C. to approximatley 50° C. Below this range, sodium bicarbonate begins to precipitate from solution causing fouling of the equipment. Above this range, carbon dioxide is released.

This regenerative step uses relatively mild conditions. The pressure of the process remains the same as in step one. The temperature is raised to a point in the range of 50 C. to 120° C., but a level below boiling is generally sufficient for the complete evolution of carbon dioxide.

Because of the limited solubility of sodium bicarbonate, sodium chloride in the scrubbing solution can be replaced by potassium chloride. The resulting chemistry is essentially the same.

Also, an amine can be substituted for ammonia in the process. For example, n-propylamine has a boiling point of 49° C. and is miscible in water. Recourse to the common solvent monoethanolamine is also possible.

The FIGURE represents a complete system using co-current flow to minimize the loss of ammonia. Item 2 is a fossil fuel burner such as, but not limited to, a coal furnace, oil burner or gas burner connected to receive a suitable fuel as shown. The combustion process within burner 2 produces a flue gas containing air and CO2 which flue gas is continuously transported by conduit 12 to the top of absorption column 10. The conduit may be a pipe or larger duct, depending on the size and capacity of burner 2. The column is prepacked with the aqueous salt ammonia solution which flows by gravity to the bottom of the column and is replenished with recycled solution by conduit 11 as hereinafter described. The result of introducing both the CO2 containing waste gas and the fresh solution to the top of the column is downward co-current flow such that the waste gas is absorbed into the solution to the lightest level of concentration. As shown, the saturated solution is conducted by conduit 16 from the bottom of the absorption column to a heater 4 which strips the CO2 from the solution according to equation No. 6 above and recycles the solution to the top of the column 10 conduit 11. Air is exhausted from the column at the bottom by vent 14. It will be understood by those skilled in the art both conduits 4 and 12 may include pumps or the like to propel the material as required. The terms "flue gas", "waste gas" and "exhaust gas" are used interchangeably in this document.

EXAMPLE

Half a cup of ammonia solution used by consumers as an "all-purpose cleaner" was added to half a cup of sparkling carbonated water. After complete mixing, 1.25 teaspoons of salt was added to the solution and stirred vigorously. No bubbles appeared. Next, the solution was heated. Considerable foaming occurred shortly before the solution began to boil.

What is claimed is:
1. A process for the recovery of carbon dioxide from a flue gas generated by the combustion of a fossil fuel and containing carbon dioxide comprising the steps of:
   a. burning a fossil fuel to create a supply of flue gas containing a mix of air and carbon dioxide;
   b. continuously transporting the flue gas supply to the top of an absorption column packed with an aqueous solution of ammonia and a salt chosen from the group consisting of Na Cl and K Cl while simultaneously replenishing the solution at the top of the column to thereby scrub the flue gas by a downward co-current flow of the gas and the solution though the column by gravity at a temperature of between 15° C. and 50° C. thereby saturating the solution with carbon dioxide to produce a bicarbonate and ammonium chloride;
   c. thereafter exhausting air at the bottom of the column and separately heating the carbon dioxide enriched solution taken from the bottom of the column to recover the absorbed carbon dioxide and regenerate the aqueous solution; and
   d. recycling the regenerated aqueous solution less the carbon dioxide to the top of the column to replenish the solution for step (b).

* * * * *